US008833527B2

(12) United States Patent
Sieradski et al.

(10) Patent No.: US 8,833,527 B2
(45) Date of Patent: Sep. 16, 2014

(54) BRAKE ASSEMBLY WITH COMPRESSION SPACER

(75) Inventors: Karen F. Sieradski, Shelby Township, MI (US); Tomasz Warzecha, Sterling Heights, MI (US); Collin R. Lockhart, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 13/550,664

(22) Filed: Jul. 17, 2012

(65) Prior Publication Data
US 2014/0020992 A1 Jan. 23, 2014

(51) Int. Cl.
*F16D 65/00* (2006.01)
*F16D 55/00* (2006.01)

(52) U.S. Cl.
CPC ...... *F16D 65/056* (2013.01); *F16D 2055/0008* (2013.01)
USPC ..................................... 188/72.4; 188/205 R

(58) Field of Classification Search
CPC ............ F16D 65/0056; F16D 65/0062; F16D 2055/0008; F16D 2055/0012
USPC ...... 188/17, 18 A, 205 R, 72.4; 280/124.105; 301/6.8
See application file for complete search history.

(56) References Cited

U.S. PATENT DOCUMENTS

| 4,673,064 | A  | * | 6/1987 | Will ............................. 188/18 A |
| 6,305,509 | B1 | * | 10/2001 | Concialdi .................. 188/73.31 |
| 6,945,369 | B1 | * | 9/2005 | Chen .............................. 188/26 |
| 2006/0289256 | A1 |   | 12/2006 | Kloos et al. |
| 2007/0125606 | A1 | * | 6/2007 | Chen ......................... 188/24.19 |
| 2007/0284201 | A1 |   | 12/2007 | Baumgartner et al. |

FOREIGN PATENT DOCUMENTS

GB        2436672 A   * 10/2007
WO     2006133916 A1   12/2006

* cited by examiner

*Primary Examiner* — Anna Momper
(74) *Attorney, Agent, or Firm* — Quinn Law Group, PLLC

(57) ABSTRACT

A braking system for retarding rotation of a wheel includes a rotor having two opposing rotor sides, wherein the rotor is coupled to the wheel. The braking system also includes a knuckle rotatably coupled to the rotor, a caliper disposed relative to the knuckle, and first and second friction pads. Each friction pad is positioned relative to one of the rotor sides. The friction pads are housed within the caliper, which includes a hydraulic piston positioned to engage one of the friction pads. Movement of the hydraulic piston engages the friction pads with the respective rotor sides to retard the wheel. The braking system also includes a spacer disposed between the caliper and the knuckle and a fastener that fixes the caliper and the spacer to the knuckle. The spacer generates a wedging effect between the caliper and the knuckle when the rotation of the wheel is being retarded.

20 Claims, 5 Drawing Sheets

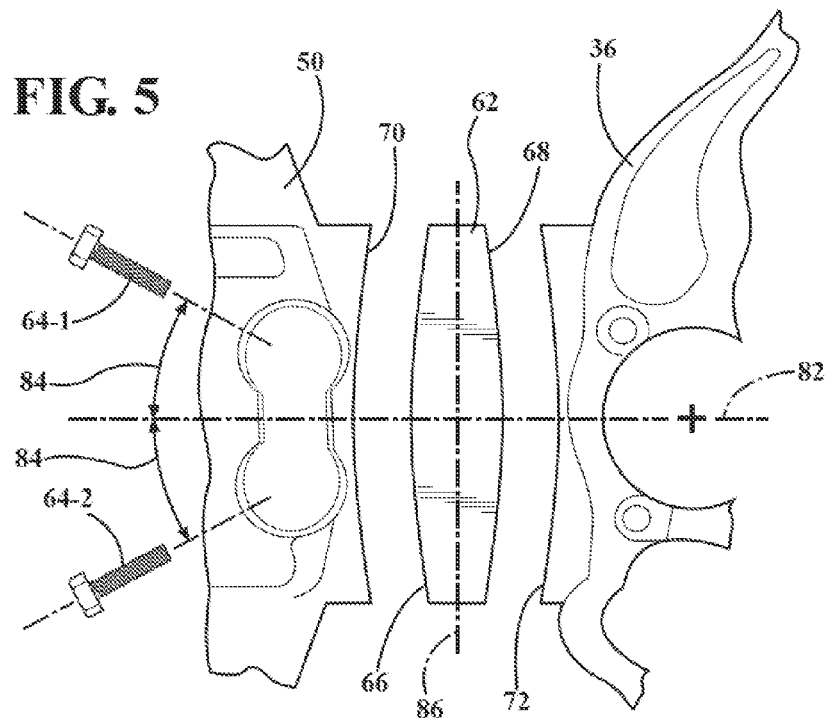
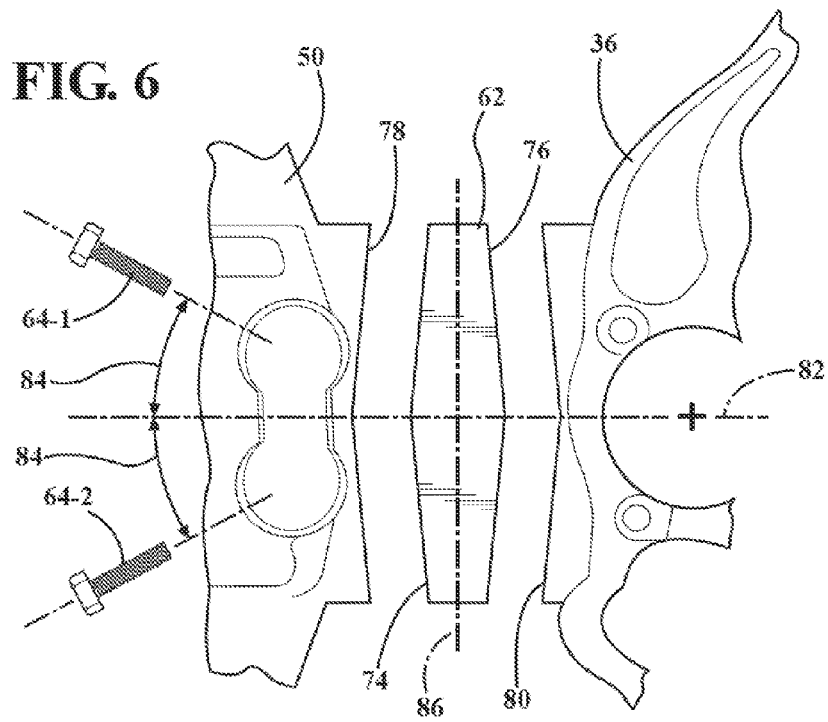

BRAKE ASSEMBLY WITH COMPRESSION SPACER

TECHNICAL FIELD

The present disclosure relates to a friction brake assembly with a compression spacer for a vehicle.

BACKGROUND

A brake is typically a mechanical device designed to inhibit motion. Brakes commonly use friction to convert kinetic energy into heat, though other methods of energy conversion may be employed. For example, regenerative braking converts much of the energy to electric energy, which may be stored for later use.

On vehicles, braking systems are employed to apply a retarding force, typically via frictional elements at the vehicle's rotating axles or wheels, to inhibit vehicle motion. Friction brakes often include shoes or pads lined with friction material for engagement with a rotating wear surface, such as a rotor or a drum. Common configurations include shoes that contact and rub on the outside of a rotating drum, commonly called a "band brake", a rotating drum with shoes that expand to rub the inside of a drum, commonly called a "drum brake", and pads that pinch a rotating disc, commonly called a "disc brake".

Disc brakes generally employ brake calipers that are mounted to a vehicle suspension and use hydraulic force to press the aforementioned shoes or pads against the respective rotating disc, to thereby pinch the disc and slow the attendant wheel. Calipers come in two general types, floating and fixed. A fixed caliper does not move relative to the disc and is thus less tolerant of disc imperfections. The fixed caliper uses one or more pistons from one side, or one or more pairs of opposing pistons to clamp the rotating disc from each side thereof. A floating or sliding caliper moves with respect to the disc, along a line parallel to the axis of rotation of the disc. In such a case, a piston on one side of the disc pushes the inner brake pad until it makes contact with the braking surface, then pulls the caliper body with the outer brake pad so pressure is applied to both sides of the disc.

SUMMARY

A braking system for retarding rotation of a wheel includes a rotor. The rotor is coupled to the wheel and includes a first rotor side opposing a second rotor side. The braking system also includes a knuckle rotatably coupled to the rotor, a caliper disposed relative to the knuckle, and a first friction pad positioned relative to the first rotor side and a second friction pad positioned relative to the second rotor side. The first and second friction pads are housed within the caliper. The caliper includes at least one hydraulic piston positioned to engage at least one of the first and second friction pads. Movement of the at least one hydraulic piston translates the first and second friction pads into frictional engagement with their respective first and second rotor sides to retard the wheel. The braking system also includes a spacer disposed between the caliper and the knuckle and a fastener that fixes the caliper and the spacer to the knuckle. The spacer generates a wedging effect between the caliper and the knuckle when the rotation of the wheel is being retarded.

The caliper may be a floating type.

The spacer may include first and second curved surfaces. Also, the caliper may include a third curved surface that matches the first curved surface. Additionally, the knuckle may include a fourth curved surface that matches the second curved surface. Furthermore, the first curved surface may seat against the third curved surface and the second curved surface may seat against the fourth curved surface.

The spacer may include first and second beveled surfaces. Also, the caliper may include a third beveled surface that matches the first beveled surface. Additionally, the knuckle may include a fourth beveled surface that matches the second beveled surface. Furthermore, the first beveled surface may seat against the third beveled surface and the second beveled surface may seat against the fourth beveled surface.

The fastener may be a first bolt and a second bolt. The caliper may be arranged symmetrically about a radial line projected from the center of the rotor. The first bolt may be disposed at an angle, i.e., inclined, relative to and on one side of the radial line, while the second bolt may be disposed at the angle relative to and on the other side of the radial line.

The angle may be equal to approximately zero degrees, or it may be in the range of approximately 5 to 60 degrees.

The first bolt and the second bolt may be arranged equidistant from the radial line.

The spacer may be a hollow structure and/or formed from aluminum.

The braking system may be employed for decelerating a vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 5 is a side view of the spacer shown in FIG. 3, wherein the spacer is depicted together with the caliper and knuckle to show respective mating surfaces on each of the three components.

FIG. 6 is a side view of the spacer shown in FIG. 4, wherein the spacer is depicted together with the caliper and knuckle to show respective mating surfaces on each of the three components.

DETAILED DESCRIPTION

Figure 1:
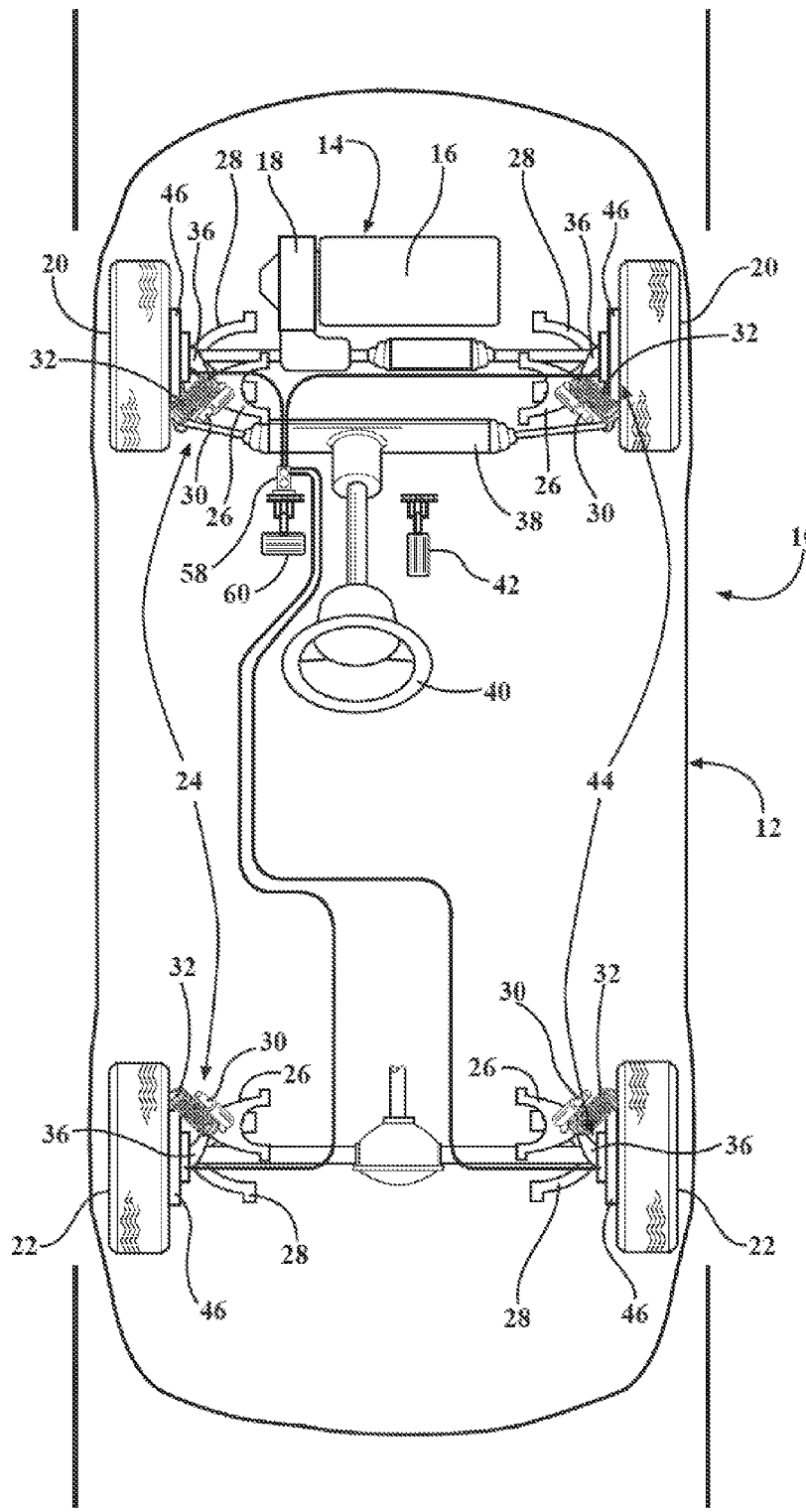
FIG. 1 is a schematic illustration of a motor vehicle having a braking system according to the disclosure.

Referring to the drawings, wherein like reference numbers refer to like components, FIG. 1 shows a schematic view of a motor vehicle 10 which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators as well as a fuel cell, neither of which are shown, but a powertrain configuration employing such devices is appreciated by those skilled in the art.

Figure 3:
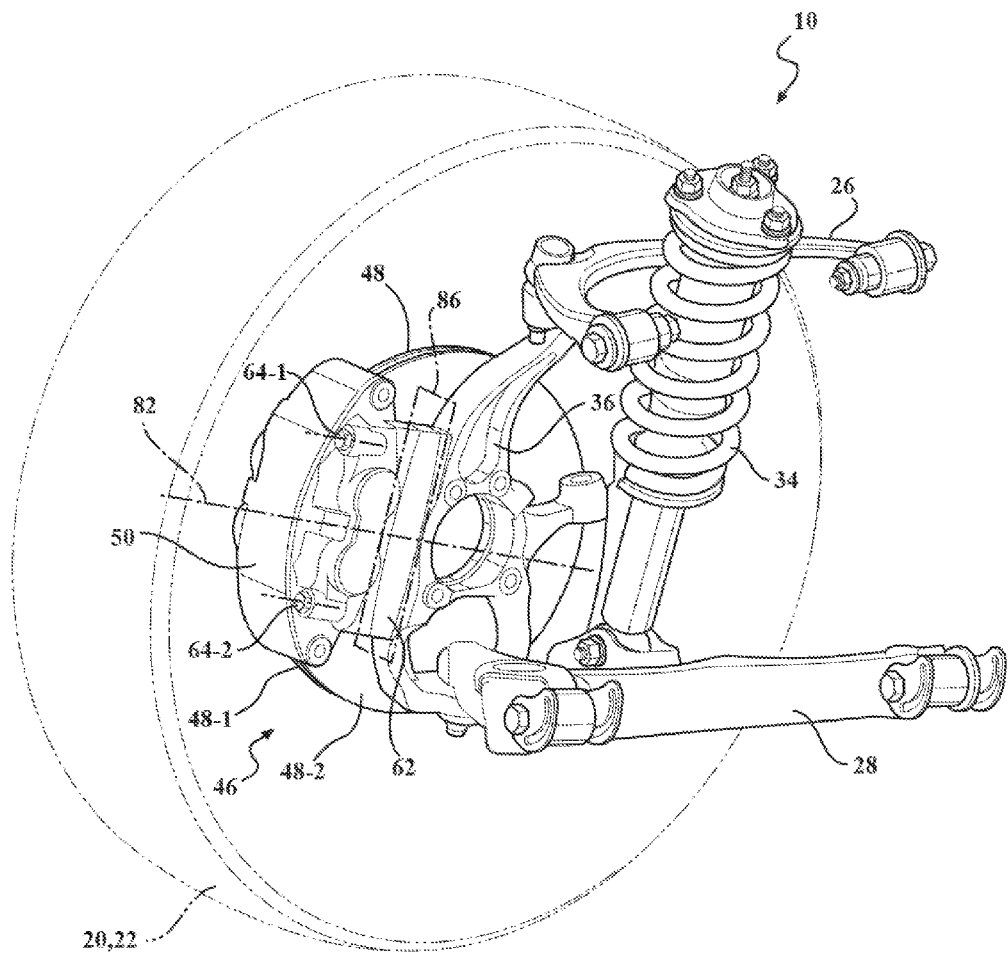
FIG. 3 is an illustration of the suspension corner shown in FIG. 2 viewed from another perspective, wherein the spacer is depicted according to one embodiment.
Figure 4:
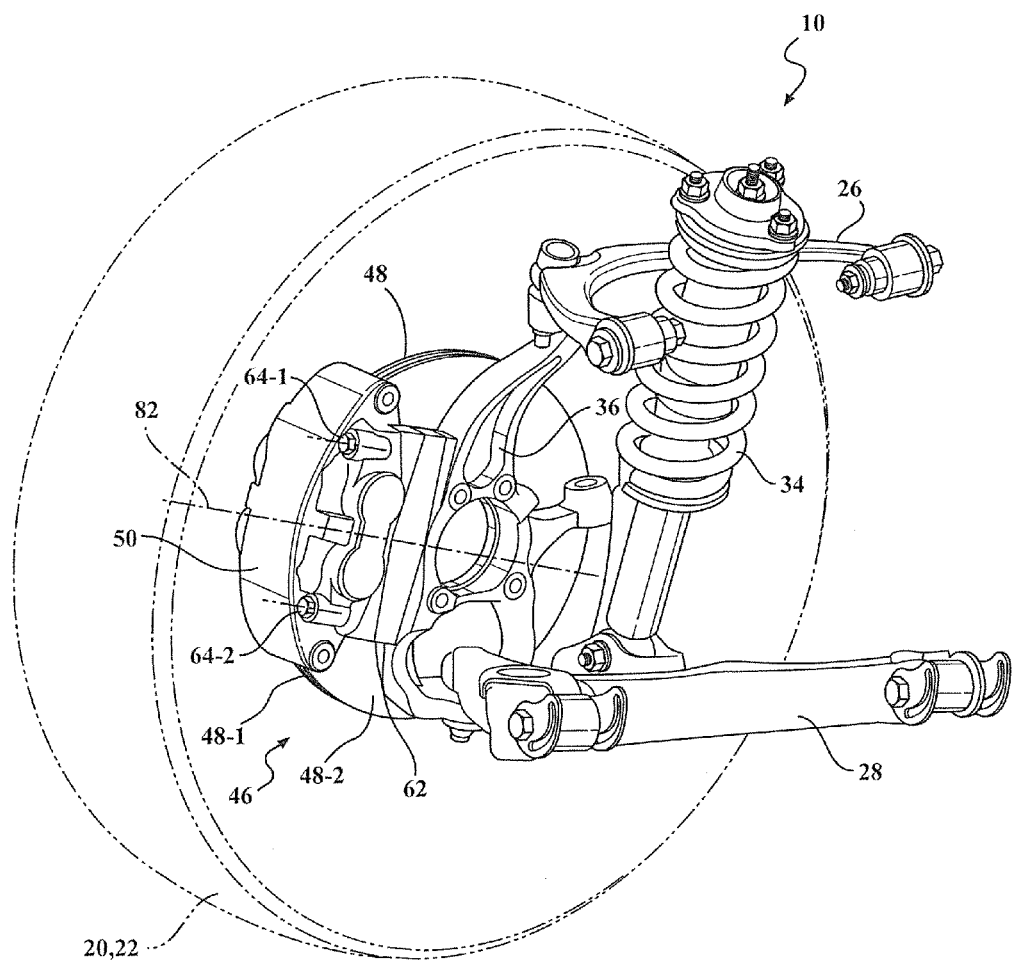
FIG. 4 is an illustration of the suspension corner shown in FIG. 2, viewed from the same perspective as in FIG. 3, wherein the spacer is depicted according to another embodiment.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface, and for maintaining handling of the vehicle. The suspension system 24 may include an upper control arm 26, a lower control arm 28, a damper 30, and a spring 32 connected to each of the front and rear wheels 20, 22. Although a specific configuration of the suspension system 24 is shown in FIG. 1, other vehicle suspension designs are similarly envisioned, such as using a strut 34 (as shown in FIGS. 2-4).

The suspension system 24 also includes a plurality of knuckles 36, each configured to support a respective wheel 20, 22 via a wheel hub and bearing assembly (not shown). FIGS. 2-4 depict a representative corner of the suspension system 24, which includes a representative knuckle 36. Each knuckle 36 is operatively connected to the body 12 via the upper control arm 26 and the lower control arm 28. Each knuckle 36 that is connected to one of the front wheels 20 is also operatively connected to a steering rack 38 such that the vehicle 10 may be steered through the front wheels 20 via a steering wheel 40. The steering wheel 40 is arranged inside the passenger compartment of the vehicle 10, such that an operator of the vehicle may command the vehicle to assume a particular direction with respect to the road surface. Additionally, an accelerator pedal 42 is positioned inside the passenger compartment of the vehicle 10, wherein the accelerator pedal is operatively connected to the powertrain 14 for commanding propulsion of the vehicle 10.

As shown in FIG. 1, a vehicle braking system 44 is operatively connected to the wheels 20, 22 for decelerating the vehicle 10. As shown in FIG. 2, the braking system 44 includes a friction braking mechanism 46 arranged at each of the wheels 20, 22. Each braking mechanism 46 is configured as a disc brake, as shown in FIGS. 2-4. Each braking mechanism 46 includes a rotor 48 configured for synchronous rotation with the respective wheel 20, 22. The rotor 48 includes a first side 48-1 and an opposing second side 48-2. The knuckle 36 is coupled to and configured to rotatably support the rotor 48. Material of the rotor 48 is generally selected for advantageous friction and wear characteristics, as well as effective heat resistance. Typically, rotors are formed out of cast iron, but may in some cases be made of composites such as reinforced carbon-carbon or ceramic matrix composites. Each braking mechanism 46 additionally includes a brake caliper 50 that is fixed relative to the knuckle 36, and employing at least one hydraulically actuated piston 51 configured to generate a clamping force 52. The caliper 50 may be a floating- or a fixed-type, as understood by those skilled in the art.

Figure 2:
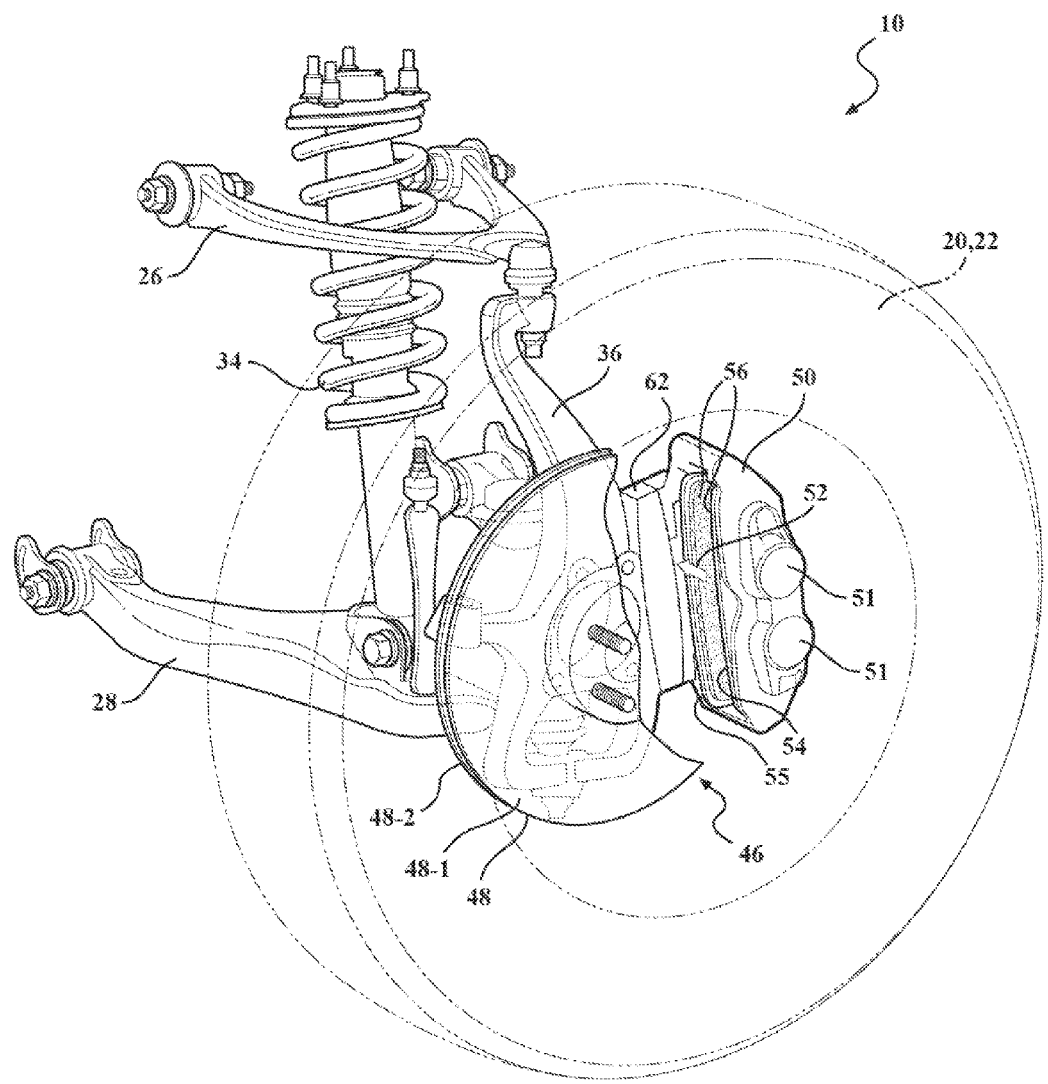
FIG. 2 is an illustration of one suspension corner of the vehicle shown in FIG. 1 and the braking system having a caliper, a knuckle, wherein the braking system is viewed from one perspective.

As may be seen in FIG. 2, each braking mechanism 46 also includes a first friction pad 54 and a second friction pad 55. The first and second friction pads 54, 55 are housed in the caliper 50. Each friction pad 54, 55 additionally includes a friction surface 56 that is configured to be pressed into contact with the rotor 48 by the clamping force 52 for retarding rotation of the respective wheel 20, 22, when the first brake pad 54 is positioned relative to the first side 48-1 and the second brake pad 55 is positioned relative to the second side 48-2 of the rotor 48. The at least one hydraulically actuated piston 51 is positioned to engage one of the first and second friction pads 54, 55. Movement of the at least one hydraulically actuated piston 51 exerts the clamping force 52 to translate the first and second friction pads 54, 55 into frictional contact with the respective first and second sides 48-1, 48-2 of the rotor 48. The frictional contact of the friction pads with the rotor 48 in turn retards rotation of the respective wheel 20, 22 and decelerates the vehicle 10. As shown in FIG. 1, the hydraulic pressure is supplied at the caliper 50 via a non-compressible fluid delivered by a hydraulic passage from a master brake cylinder 58. The clamping force 52 is controlled at the master brake cylinder 58 via a brake pedal 60. As may be seen in FIG. 1, the brake pedal 60 is positioned inside the passenger compartment of the vehicle 10, and is adapted to be controlled by the operator of the vehicle.

As shown in FIGS. 2-4, the braking mechanism 46 also includes a spacer 62 disposed between the caliper 50 and the respective knuckle 36. A plurality of fasteners 64, such as a first bolt 64-1 and a second bolt 64-2 (as may be seen in FIGS. 3 and 4) are employed to fix the caliper 50 and the spacer 62 to the respective knuckle 36. The spacer 62 is configured to generate a wedging effect between the caliper 50 and the knuckle 36 when the rotation of the respective wheel 20, 22 is being retarded. The spacer 62 may have a hollow structure for reduced mass. Furthermore, the spacer 62 may be formed from a rigid material such as steel or aluminum, wherein aluminum may be selected to minimize mass of the resultant sub-assembly of spacer 62, caliper 50, and knuckle 36.

As shown in FIG. 5, according to one embodiment the spacer 62 may include a first curved surface 66 and a second curved surface 68. The caliper 50 includes a third curved surface 70 configured to match the first curved surface 66. The knuckle 36 includes a fourth curved surface 72 configured to match the second curved surface 68. Upon final assembly, the first curved surface 66 seats against the third curved surface 70 and the second curved surface 68 seats against the fourth curved surface 72. As may be seen in FIGS. 2 and 3, the curved contours of first surface 66 and the second surface 68 are oriented opposite to one another. Such opposite orientation of the curved surfaces 68 and 68 wedges the spacer between the caliper 50 and the knuckle 36 under a braking maneuver of the vehicle 10. In other words, when the braking mechanism 46 is applied and the caliper 50 tends to separate from the spacer 62 and also from the knuckle 36, the spacer of FIG. 2 acts as a wedge between the caliper 50 and the knuckle 36, thereby minimizing separation between the caliper and the knuckle.

Alternatively, according to another embodiment shown in FIG. 6, the spacer 62 includes a first beveled surface 74 and a second beveled surface 76. The caliper 50 includes a third beveled surface 78 configured to match the first beveled surface 74. The knuckle 36 includes a fourth beveled surface 80 configured to match the second beveled surface 76. The first beveled surface 74 seats against the third beveled surface 78 and the second beveled surface 76 seats against the fourth beveled surface 80. As may be seen in FIG. 6, the beveled contours of the first surface 74 and the second surface 76 are oriented opposite to one another. Similar to the configuration shown in FIG. 5 and described above, such opposite orientation of the beveled surfaces 74 and 76 wedges the spacer between the caliper 50 and the knuckle 36 under a braking maneuver of the vehicle 10. Accordingly, when the braking mechanism 46 is applied and the caliper 50 tends to separate from the spacer 62 and also from the knuckle 36, the spacer of FIG. 6 acts as a wedge between the caliper 50 and the knuckle 36, thereby minimizing separation between the caliper and the knuckle. As such, the wedging action described above with respect to each of FIGS. 3 and 4 permits the spacer 62 to facilitate retention of clamp load by the fasteners 64 such that attachment of the caliper 50 to the knuckle 36 may be maintained.

As additionally shown in FIGS. 5 and 6, the caliper 50 is arranged symmetrically about a radial line 82 projected from the center of the rotor 48. Furthermore, the first bolt 64-1 may be disposed at an incline angle 84 relative to and on one side of the radial line 82. The first bolt 64-1 and the second bolt 64-2 may also be arranged equidistant from the radial line 82. As shown, the second bolt 64-2 is also disposed at the incline angle 84 relative to and on the other side of the radial line 82, such that the actual incline of the two bolts 64-1, 64-2 is opposite to one another. The angle 84 may be in the range of approximately 0 to 90 degrees, such as within +/−1 degree of the outside boundaries of the specified range, depending on surface shape of the caliper 50 and the particular vehicle application. In the case that the angle 84 is non-zero, the angle may further be selected from the range of approximately 5 to 60 degrees, for example within +/−1 degree of the specified range.

The angle 84 may be selected to orient the respective bolts 64-1, 64-2 substantially parallel to the line 82 and generally perpendicular to a plane 86 in which the spacer 62 is oriented in either the embodiment of FIG. 5 or the embodiment of FIG. 6. Therefore, the bolts 64-1 and 64-2 being oriented at the angle 84 may further facilitate maintaining attachment of the caliper 50 to the knuckle 36 during a braking maneuver by applying the fastener clamping load perpendicular to the surface of the spacer 62. Consequently, while the subject braking mechanism 46 is being applied to slow the vehicle 10, the first and second bolts 64-1 and 64-2 together with the spacer 62 generate a wedging effect intended to limit separation between the caliper 50 and the knuckle 36 and increase effectiveness of the braking system 44.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A braking system for retarding rotation of a wheel, comprising:
   a rotor coupled to the wheel and having a first rotor side opposing a second rotor side;
   a knuckle rotatably coupled to the rotor;
   a caliper disposed relative to the knuckle;
   a first friction pad positioned relative to the first rotor side and a second friction pad positioned relative to the second rotor side, wherein the first and second friction pads are housed within the caliper, wherein the caliper includes at least one hydraulic piston positioned to engage at least one of the first and second friction pads, and wherein movement of the at least one hydraulic piston translates the first and second friction pads into frictional engagement with their respective first and second rotor sides to retard the wheel;
   a spacer disposed between the caliper and the knuckle; and
   a fastener configured to fix the caliper and the spacer to the knuckle;
   wherein the spacer is configured to generate a wedging effect between the caliper and the knuckle when the rotation of the wheel is being retarded.

2. The braking system according to claim 1, wherein the caliper is arranged to float relative to the rotor.

3. The braking system according to claim 1, wherein:
   the spacer includes a first curved surface and a second curved surface;
   the caliper includes a third curved surface configured to match the first curved surface;
   the knuckle includes a fourth curved surface configured to match the second curved surface;
   the first curved surface seats against the third curved surface; and
   the second curved surface seats against the fourth curved surface.

4. The braking system according to claim 1, wherein:
   the spacer includes a first beveled surface and a second beveled surface;
   the caliper includes a third beveled surface configured to match the first beveled surface;
   the knuckle includes a fourth beveled surface configured to match the second beveled surface;
   the first beveled surface seats against the third beveled surface; and
   the second beveled surface seats against the fourth beveled surface.

5. The braking system according to claim 4, wherein:
   the fastener includes a first bolt and a second bolt;
   the caliper is arranged symmetrically about a radial line projected from the center of the rotor; and
   the first bolt is disposed at an angle relative to and on one side of the radial line and the second bolt is disposed at the angle relative to and on the other side of the radial line.

6. The braking system according to claim 5, wherein the angle is equal to approximately zero degrees.

7. The braking system according to claim 5, wherein the angle is in the range of approximately 5 to 60 degrees.

8. The braking system according to claim 5, wherein the first bolt and the second bolt are arranged equidistant from the radial line.

9. The braking system according to claim 1, wherein the spacer is a hollow structure.

10. The braking system according to claim 1, wherein the spacer is constructed from aluminum.

11. A vehicle comprising:
    a rotor configured to synchronously rotate with a wheel and having a first rotor side opposing a second rotor side;
    a knuckle rotatably coupled to the rotor;
    a caliper disposed relative to the knuckle;
    a first friction pad positioned relative to the first rotor side and a second friction pad positioned relative to the second rotor side, wherein the first and second friction pads are housed within the caliper, wherein the caliper includes at least one hydraulic piston positioned to engage at least one of the first and second friction pads, and wherein movement of the at least one hydraulic piston translates the first and second friction pads into frictional engagement with their respective first and second rotor sides to retard the wheel and thereby decelerate the vehicle;
    a spacer disposed between the caliper and the knuckle; and
    a fastener configured to fix the caliper and the spacer to the knuckle;
    wherein the spacer is configured to generate a wedging effect between the caliper and the knuckle when the vehicle is being decelerated.

12. The vehicle according to claim 11, wherein the caliper is arranged to float relative to the rotor.

13. The vehicle according to claim 11, wherein:
the spacer includes a first curved surface and a second curved surface;
the caliper includes a third curved surface configured to match the first curved surface;
the knuckle includes a fourth curved surface configured to match the second curved surface;
the first curved surface seats against the third curved surface; and
the second curved surface seats against the fourth curved surface.

14. The vehicle according to claim 11, wherein:
the spacer includes a first beveled surface and a second beveled surface;
the caliper includes a third beveled surface configured to match the first beveled surface;
the knuckle includes a fourth beveled surface configured to match the second beveled surface;
the first beveled surface seats against the third beveled surface; and
the second beveled surface seats against the fourth beveled surface.

15. The vehicle according to claim 14, wherein:
the fastener includes a first bolt and a second bolt;
the caliper is arranged symmetrically about a radial line projected from the center of the rotor; and
the first bolt is disposed at an angle relative to and on one side of the radial line and the second bolt is disposed at the angle relative to and on the other side of the radial line.

16. The vehicle according to claim 15, wherein the angle is equal to approximately zero degrees.

17. The vehicle according to claim 15, wherein the angle is in the range of approximately 5 to 60 degrees.

18. The vehicle according to claim 15, wherein the first bolt and the second bolt are arranged equidistant from the radial line.

19. The vehicle according to claim 11, wherein the spacer is a hollow structure.

20. The vehicle according to claim 11, wherein the spacer is constructed from aluminum.

* * * * *